Aug. 20, 1946.             S. E. DANSEL                 2,406,204
                        TAP OPERATING MECHANISM
                        Filed Dec. 30, 1944          2 Sheets-Sheet 1
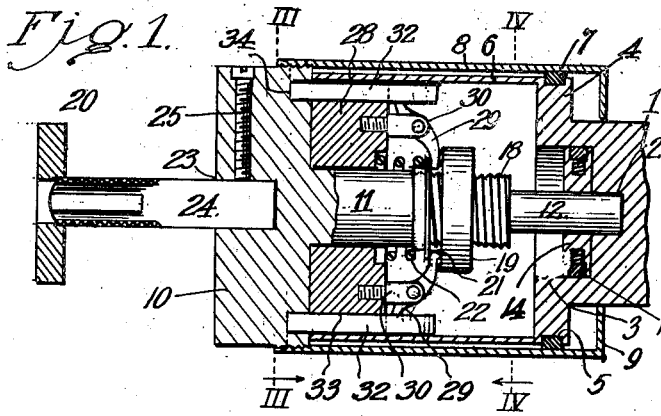
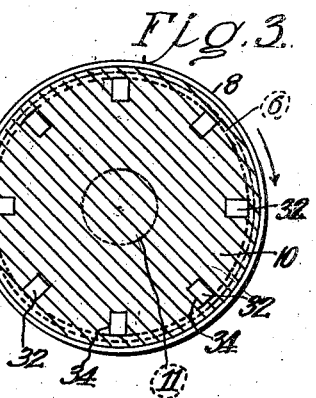
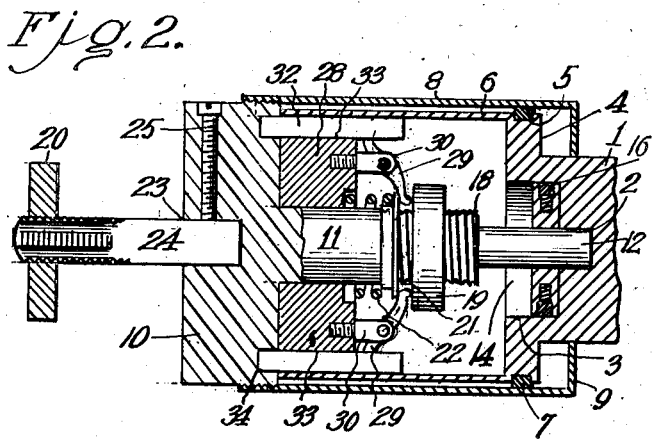
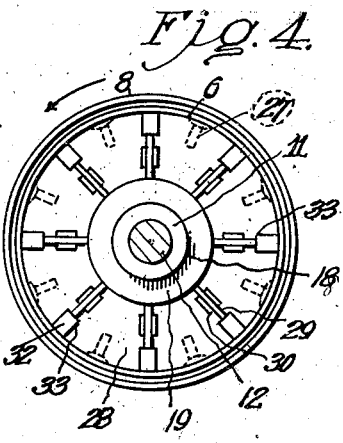
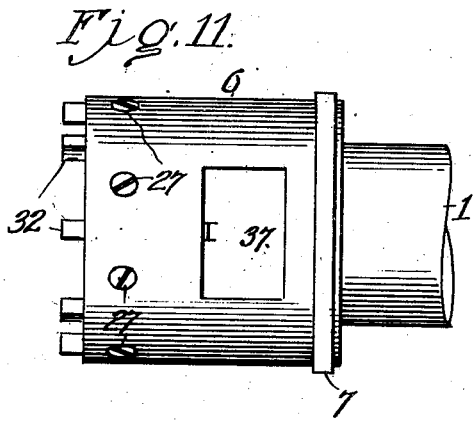
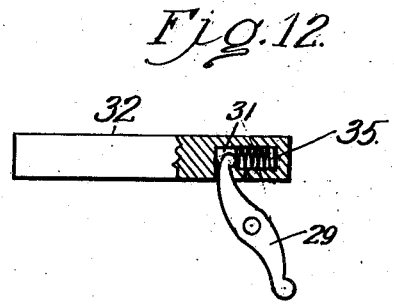
Inventor
Samuel E. Dansel.
By George Thorpe
Attorney Aug. 20, 1946.  S. E. DANSEL  2,406,204
TAP OPERATING MECHANISM
Filed Dec. 30, 1944  2 Sheets-Sheet 2

Inventor
Samuel E. Dansel.
By
Attorney

Patented Aug. 20, 1946

2,406,204

UNITED STATES PATENT OFFICE 2,406,204

TAP OPERATING MECHANISM

Samuel E. Dansel, Cheyenne, Wyo.

Application December 30, 1944, Serial No. 570,577

5 Claims. (Cl. 10—89)

This invention relates to an apparatus for effecting the advance of a threading tap to and its withdrawal from a work-piece, and an object is to produce a tap-carrying mechanism for accomplishing the results indicated, and which is susceptible of adjustment to accommodate work-pieces of varying thickness or sockets of varying depth.

Another object of the invention is to produce a mechanism whereby the "release" after threading a work-piece, is effected smoothly and efficiently without jarring or subjection to lateral or bending strain.

More specifically, my object is to produce a tap-carrying mechanism for advancing a rigidly-held or locked tap into engagement with a revolving work-piece to thread an opening thereof; freeing the tap for spinning with the work-piece as the threading of the latter is completed; preventing reversed operation of the tap upon reversal of the rotation of the work-piece, to utilize the power of the latter to effect back movement of the tap to its original or initial position relative to said mechanism; and for relocking the tap to said mechanism preliminary to its next advance for a threading operation on another work-piece.

With the objects set forth in view, and others as hereinafter appear, the invention consists in certain novel and useful features of construction and organization of parts hereinafter described and claimed; and in order that it may be fully understood, reference is to be had to the accompanying drawings, in which:

Figure 1 is a central longitudinal sectional view of mechanism embodying the invention in starting relation to a work-piece to be threaded.

Figure 2 is a similar view but showing the mechanism advanced and the work-piece threaded.

Figure 3 is a cross section taken on the broken line III—III of Figure 1.

Figure 4 is a cross section taken on the broken line IV—IV of Figure 1.

Figure 11 is an elevational view of a non-rotatable part of the mechanism, for effecting initial advance movement of the tap, and adapted for relocked relation with the latter, preliminary to a threading engagement with another work-piece.

Figure 12 is a detail on an enlarged scale, disclosing the relation between one of the locking pins, a rock-lever therefor, and a spring for increasing the retracted movement of the locking pin.

Figure 5:
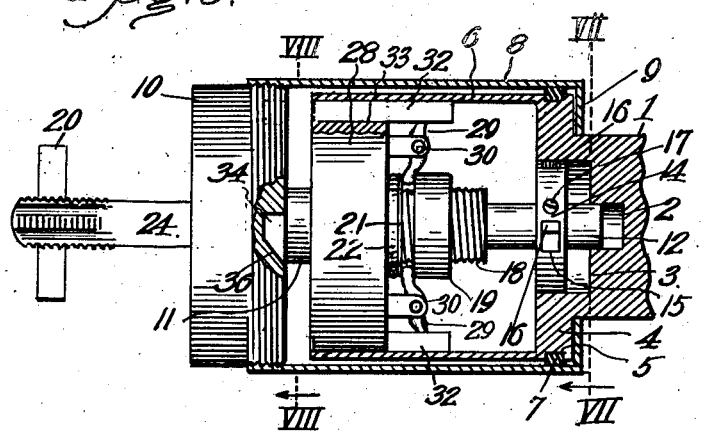
Figure 5 shows the tap and parts movable therewith, pulled forward to unlock the tap from its carrying mechanism under the force applied on the tap by the threaded work-piece, the tap and its connected parts being free to spin with the revolving work-piece.
Figure 6:
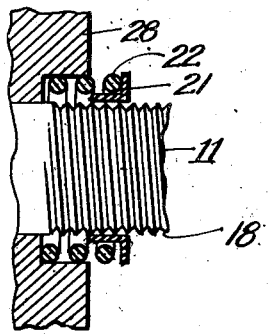
Figure 6 is an enlarged fragmentary section for disclosing the relation of certain parts more clearly than in preceding figures.

Referring to the drawings in detail, where corresponding reference characters identify similar parts in all of the views, 1 indicates a non-rotatable element to be fastened in any suitable manner to the tail stock of a lathe or equivalent machine, not shown. At its front end the element is provided with an axial pilot socket 2, opening into a circular chamber 3 of the element, and with a circular enlargement or head 4, provided peripherally with a groove 5, and a forwardly projecting cylindrical shell 6. The groove contains a packing or sealing ring 7 of compressible material, in contact with a cylindrical housing 8, inclosing but not contacting the head 4 and the shell. The rear end of the housing has an inturned flange 9, closely surrounding the element 1 and constituting a stiffener for the housing, which flange in its initial position is spaced from the head to allow for forward movement independent of corresponding movement on the part of said element 1.

The front end of the housing fits upon and is fastened in threaded relation or otherwise to the circular head 10, of a cylindrical shank or shaft 11, disposed axially of the said head and element 1, and terminating at its rear end in a pilot 12 fitting slidingly and rotatably in socket 2, and initially abutting the bottom of the latter. Keyed upon the pilot 12, to insure rotation therewith, is a clutch occupying chamber 3, comprising a circular body 14 provided with a plurality of peripheral notches 15 containing spring-actuated dogs 16, so disposed that the clutch may rotate in one direction only, as an attempt to turn in the other direction causes the dogs to bite against the surrounding wall of the chamber 3 of the non-rotatable element 1. To prevent longitudinal shifting of the clutch on the pilot a clamp screw 17 of the clutch impinges on the pilot.

Adjacent the pilot the shank is threaded as at 18, and adjustable thereon is a collar or nut 19, the adjustment of which is to accommodate the mechanism for use with work-pieces 20, of varying thickness, or for threading sockets of varying lengths in work-pieces. The shank 11 may also be provided forward of the collar 19 with a slidable washer 21 and a strong or stiff coil spring 22, the function of which hereinafter appears.

The head 10 of the shank 11, is provided with a front axial socket 23, into which the tap 24 is secured firmly by a clamping screw 25 or otherwise, the tap being alined with the opening of the work-piece or incipient nut to be threaded, carried by a chuck (not shown) of the headstock of the lathe or the like.

Fitting within the front end of the shell 6 and secured thereto by a plurality of screw-bolts 27, is a non-rotatable collar 28 in journaled relation to the shank 11, and initially abutting the rear face of the head 10, and forming a resistance point for the compression of the spring 22 when the tap is advanced independently of the element 1 and the parts in fixed relation thereto.

Normally said spring applies pressure rearwardly on the inner ends of a series of radially arranged double-acting rock-levers 29, applying the pressure preferably through the interposed washer 21 slidable on the threaded surface of the shank 11. The levers 29 are pivoted at intermediate points in brackets 30 secured to collar 28, and the outer ends of the levers fit within sockets 31 provided in the inner faces of slidable locking pins 32 engaging longitudinal peripheral grooves or channels 33 in the collar 28. Initially the locking pins engage alined sockets 34 in the rear face of the head 10 to lock the latter and the tap against rotation until the latter has completed its threading operation, and during such action the springs 35 within the pins 32 are partially compressed by said levers under the pressure applied on the inner ends of the rock-levers by the advancing collar 19. This compression, as the withdrawal of the locking pins ends, provides for a slight but quick increase in the withdrawal of the pins, through reaction or expanding movement of the springs 35, and relieves the tap from jar and, when the tap is unlocked and spinning freely with the threaded work-piece, from producing a clicking noise by contact with the walls of the radially disposed sockets 34 of the head 10. Such contacts are also objectionable as tending to wear away the pin ends or the side walls of the sockets. As a means for facilitating the re-locking of the tap with the non-rotatable collar 28, at the proper time, as hereinafter explained, each socket is widened by sloping one of its side walls, as at 36.

The shell 6 is provided with an opening 37 through which a spanner wrench or other proper tool may be introduced for adjusting the collar 19 on the shank toward or from the rock-levers for accommodating the tap to produce threads matching the thickness of the work-piece, access to said opening being obtained by unscrewing the housing and sliding it rearward to the required extent. The interior of the mechanism is adapted to be charged with lubricating oil accessible to all of the operative parts except the tap itself, as the packing or sealing ring 7 closes the only point where leakage could otherwise occur.

Figure 7:
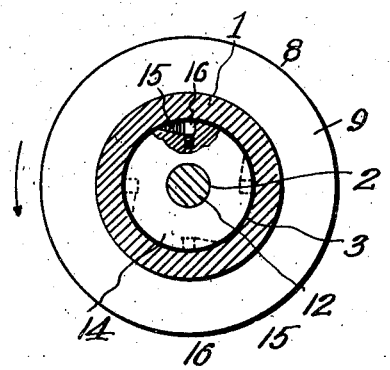
Figure 7 is a cross section taken on the broken line VII—VII of Figure 5, disclosing the clutch mechanism for preventing reverse rotation of the tap under reversed rotation of the work-piece.
Figure 8:
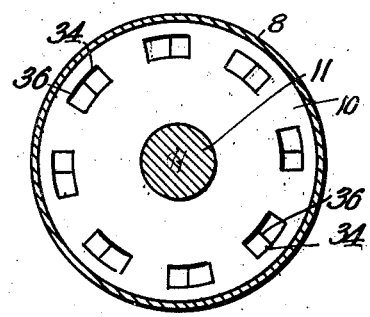
Figure 8 is a section on the line VIII—VIII of Figure 5.
Figure 9:
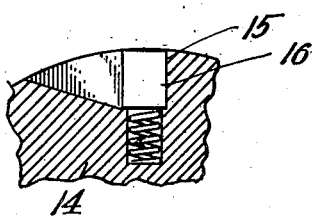
Figure 9 is an enlarged rear-face view of a fragment of a clutch carried by and movable with the tap.
Figure 10:
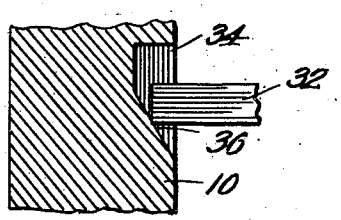
Figure 10 is a fragmentary sectional view showing the relation between a header carrying the tap, and one of the locking pins of the mechanism.

With the mechanism in starting position as in Figure 1, the operation is as follows: Assuming the work-piece to be revolving in the direction indicated by the arrows (Figures 4 and 7), the tail stock is advanced and moves the entire assembly from the position (Figure 1) to the position (Figure 2), the tap 24 completing the threading of the work-piece through the turning of the latter upon the non-rotating but advancing tap. As the work-piece threading is completed the advance of the element 1 and the non-rotatable parts carried thereby ceases, but does not arrest the advance of the tap under the continued operation of the work-piece. The additional advance of the tap is accompanied by the parts connected therewith and as the head 10 is moving forward the collar or nut, overcoming the resistance of the spring 22, applies forward pressure on the inner ends of the rock-levers 29, and causes them to impart backward movement to the locking pins. The instant the head 10 is unlocked from the non-rotatable collar 28, the advance of the tap ceases and it spins freely with the revolving work-piece.

To effect the "release" or disengagement of the tap from the work-piece, the revolution of the latter is reversed, and as this occurs, the dogs 16 of the clutch body 14, by centrifugal force and the pressure of springs in the clutch-body, bite against the surrounding wall of chamber 3, and prevent the tap from turning with the work-piece. As a result the tap and the parts movable therewith, are forced back by the work-piece and the collar 19, in such movement, leaves spring 22 free to effect reverse rocking action of the rock-levers and forward movement of the locking-pins into the sockets of head 10, if at the time, the latter are in register with the pins. If not so registered, the advancement of the tap in to frictional contact with the walls of the opening in the next work-piece to be threaded, will result in a turning of said head until the sockets are alined with said pins, when the latter will snap into the sockets and relock the tap to the non-rotatable features of the mechanism, for the ensuing threading of such work-piece.

From the foregoing it will be apparent that I have produced a mechanism embodying the features set forth as desirable, and while I have illustrated and described its preferred construction and mode of operation, it is to be understood that I reserve the right to all modifications properly falling within the spirit and scope of the appended claims.

I claim:

1. A tap operating mechanism comprising a non-rotatable member, a rotatable member carried by the first-named member and including a head having a circular series of sockets and a shank axially of said members, a tap projecting forward from the rotatable member in alinement with said shank, and a revolving work-piece having an opening axially alined with the tap, a clutch on and movable with the shank, a collar on and rotatable with the shank, locking pins carried by and slidable on the non-rotatable member toward and from the head of the rotatable member for engagement with or from the sockets of the said head, rock-levers carried by the non-rotatable member and engaging said locking pins, and an expansion spring interposed between the non-rotatable member and the rock-levers; the advance of the assembly effecting engagement of the tap with the opening of the work-piece to thread said opening and to cause said collar to operate said rock-levers against the resistance of said spring, to withdraw the locking pins from said sockets and free the rotatable member to spin with the work-piece.

2. A tap operating mechanism characterized as in claim 1, and in which reversed rotation of the work-piece following the threading of its opening, causes the clutch to lock the tap against rotation but lets it move rearward and permit the said spring to re-rock said levers to advance the locking pins into the sockets of the head of the rotatable member.

3. In an appliance for holding and operating a thread-cutting tool, a non-rotatable reciprocatory member having a forwardly projecting cylindrical shell, a collar within and in fixed relation to said shell and provided with a longitudinally disposed reciprocatory locking-pin; a rock-lever mounted on said collar and pivotally engaged with said locking-pin, a spring for normally holding the lever at one end of its movement to cause the locking-pin to protrude from the front face of said collar, a rotatable spindle extending slidably through said collar axially thereof, and provided with a head forward of the collar, provided with a notch receiving the protruded end of said locking-pin, said head being adapted to rigidly carry a thread-cutting tool, the spindle and its head and said tool being movable forward under advance movement of the non-rotatable member for engaging the said tool with a revolving part to be threaded, the threading operation thus started continuing until the advance of the said member ceases, the continued engagement of the tool and work piece then continuing the forward movement of the spindle, means movable with the spindle in its continued advance to re-rock the lever and cause the locking-pin to withdraw from the said notch to permit the spindle to spin with the revolving work piece, and a clutch carried by the spindle adapted upon reversal of the rotation of the work piece, to grip the non-rotatable member and cause the reversed rotation of the work piece to impart rearward travel to the spindle until the thread-cutting tool is disengaged from the work piece.

4. In an appliance for holding and operating a thread-cutting tool, a non-rotatable reciprocatory member having a forwardly-projecting cylindrical shell, a collar within and in fixed relation to said shell and provided with a longitudinally disposed reciprocatory locking-pin; a rock-lever mounted on said collar and pivotally engaged with said locking-pin, a spring for normally holding the lever at one end of its movement to cause the locking-pin to protrude from the front face of said collar, a rotatable spindle extending slidably through said collar axially thereof, and provided with a head forward of the collar, provided with a notch receiving the protruded end of said locking-pin, said head being adapted to rigidly carry a thread-cutting tool, the spindle and its head and said tool being movable forward under advance movement of the non-rotatable member for engaging the said tool with a revolving part to be threaded, the threading operation thus started continuing until the advance of the said member ceases, the continued engagement of the tool and work piece then continuing the forward movement of the spindle, means movable with the spindle in its continued advance, to rerock the lever and cause the locking pin to withdraw from the said notch to permit the spindle to spin with the revolving work piece, a clutch carried by the spindle adapted upon reversal of the rotation of the work piece, to grip the non-rotatable member and cause the reversed rotation of the work piece to impart rearward travel to the spindle until the thread-cutting tool is disengaged from the work piece, and a spring movable with the locking-pin and bearing forwardly on the lever and rearwardly on the locking-pin for compression by the lever in moving said pin rearward, and for reexpanding to increase the rearward movement of the pin as the corresponding movement of the lever ends.

5. In a device for operating a thread-cutting tool, a non-rotatable member having a cylindrical head and a cylindrical shell projecting forward from said head, a collar within and fast to said shell, provided with a longitudinally through passage, the shell having a side opening between said head and collar, a cylindrical spindle extending axially through and slidable and rotatable in said collar, and provided forward of the latter with a rigid head, a cylindrical housing inclosing and spaced from said shell and detachably secured to and closed by said spindle head, and provided rearward of and normally spaced from the head of the non-rotatable member with an inturned flange, a packing ring between and engaging the last-named head and the housing, a collar or nut longitudinally-adjustable on the spindle within said shell, a rock-lever mounted radially on the collar fast to the shell and disposed with its inner end in the path of forward movement of said collar or nut, a longitudinal locking-pin in the path of the collar fast to said shell, provided with an opening pivotally receiving the outer end of said lever, and a coil spring around the spindle between the collar fast to said shell and the inner end of said rock-lever, and normally holding the locking pin protruded forward from the last-named collar, the head of the spindle having a beveled-walled notch for normal engagement by the protruded locking pin.

SAMUEL E. DANSEL.